United States Patent
Gleaves

[15] 3,684,393
[45] Aug. 15, 1972

[54] PILOT HOLE ENLARGER

[72] Inventor: Donald H. Gleaves, 50 Somerset St., Huntington Station, N.Y. 11746

[22] Filed: Jan. 5, 1971

[21] Appl. No.: 104,152

Related U.S. Application Data

[63] Continuation of Ser. No. 788,276, Dec. 31, 1968, abandoned.

[52] U.S. Cl. ............................................. 408/159
[51] Int. Cl. ........................................... B23b 29/034
[58] Field of Search.........82/1.2, 1.4; 408/73, 81–83, 408/110–112, 147, 153–155, 157–160, 172, 180, 150, 151

[56] References Cited

UNITED STATES PATENTS

| | | | |
|---|---|---|---|
| 3,200,673 | 8/1965 | Pfeifer | 408/154 |
| 1,878,175 | 9/1932 | Oyen | 408/157 |
| 1,946,753 | 2/1934 | Moberley | 408/81 |
| 2,545,443 | 3/1951 | Bowren | 408/158 |
| 2,706,421 | 4/1955 | Fried et al. | 408/180 |
| 3,274,861 | 9/1966 | Cgubak | 408/180 |

Primary Examiner—Gerald A. Dost
Attorney—Arthur T. Groeninger

[57] ABSTRACT

A cutting tool and method for enlarging an aperture in one member so that it is made concentric and of the same diameter as a reference aperture in an adjacent, underlying member. The tool utilizes a plurality of cutters each formed with a cutting edge for cutting away the material from the aperture to be enlarged. Each cutter is furthermore formed with a cam surface disposed for coaction with a thrust cone which acts thereon to urge the cutter cutting edge into contact with the periphery of the aperture being enlarged. Each of the cutters further includes an abutment surface which prevents further cutting of the aperture to be enlarged in wall areas aligned with wall areas of the reference aperture in the adjacent member; the abutment surface being adapted to engage a wall portion of the reference aperture when said wall areas are aligned thereby preventing the cutter cutting edge from coming into cutting engagement with the periphery of the aperture to be enlarged.

5 Claims, 7 Drawing Figures

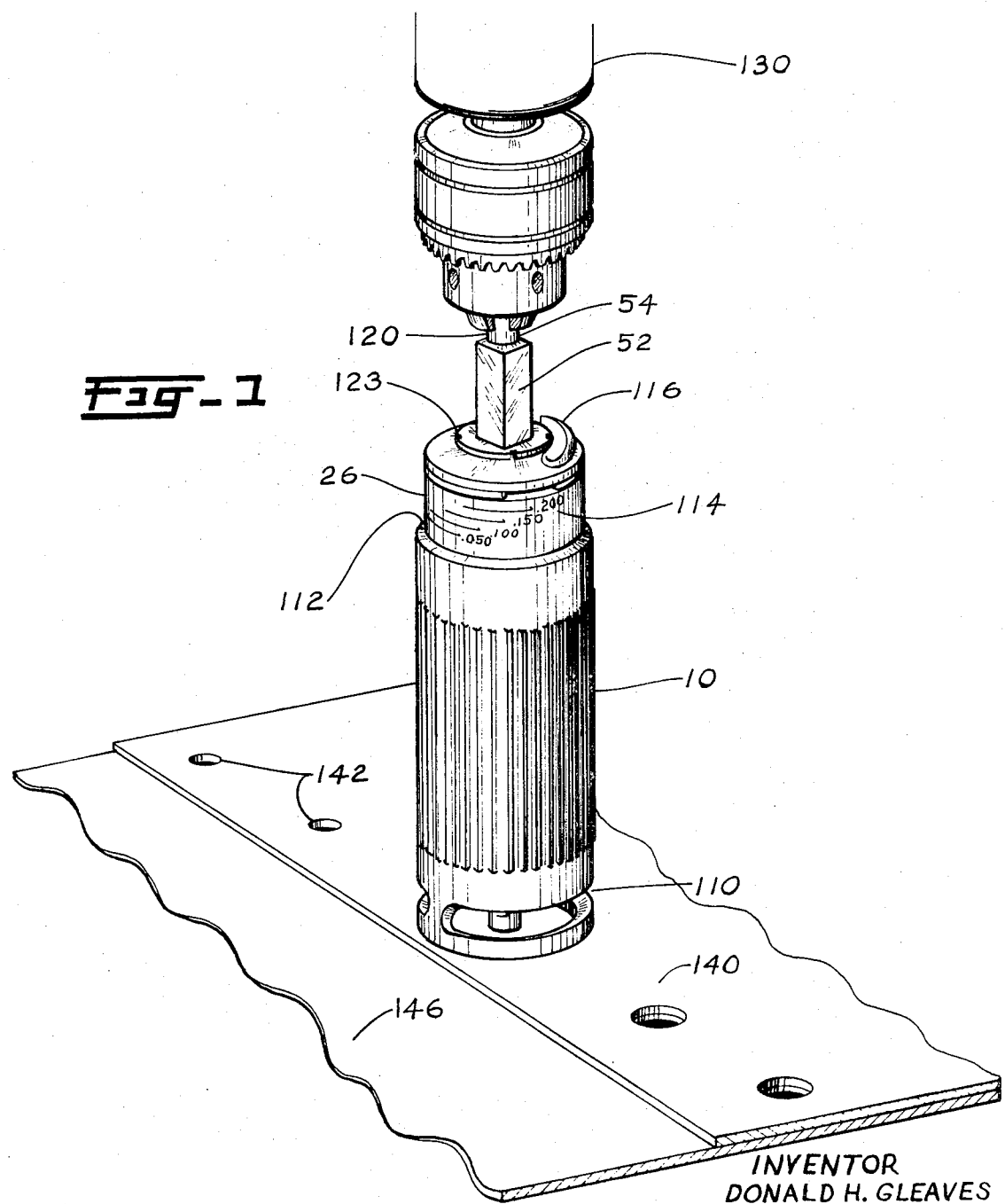

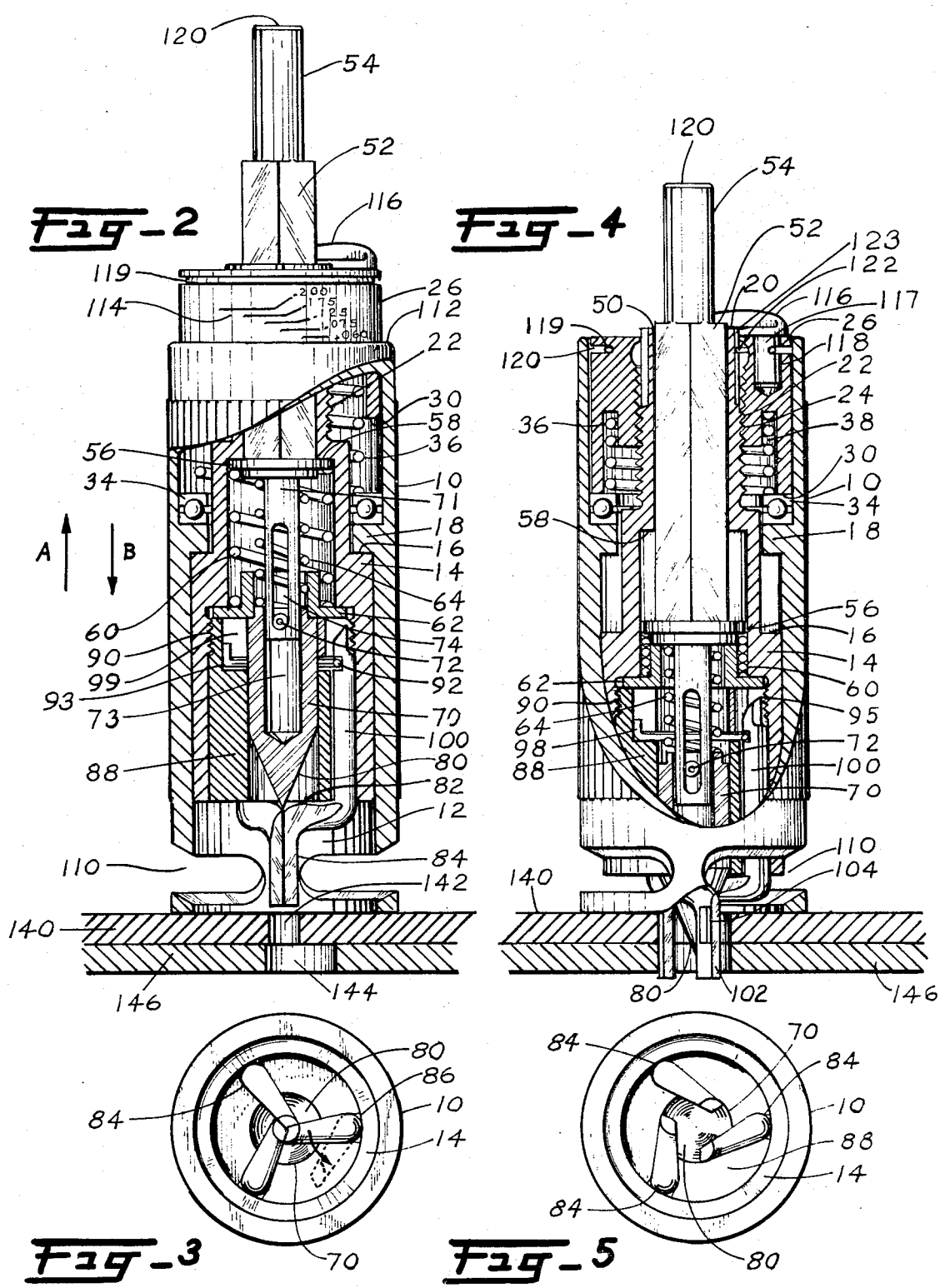

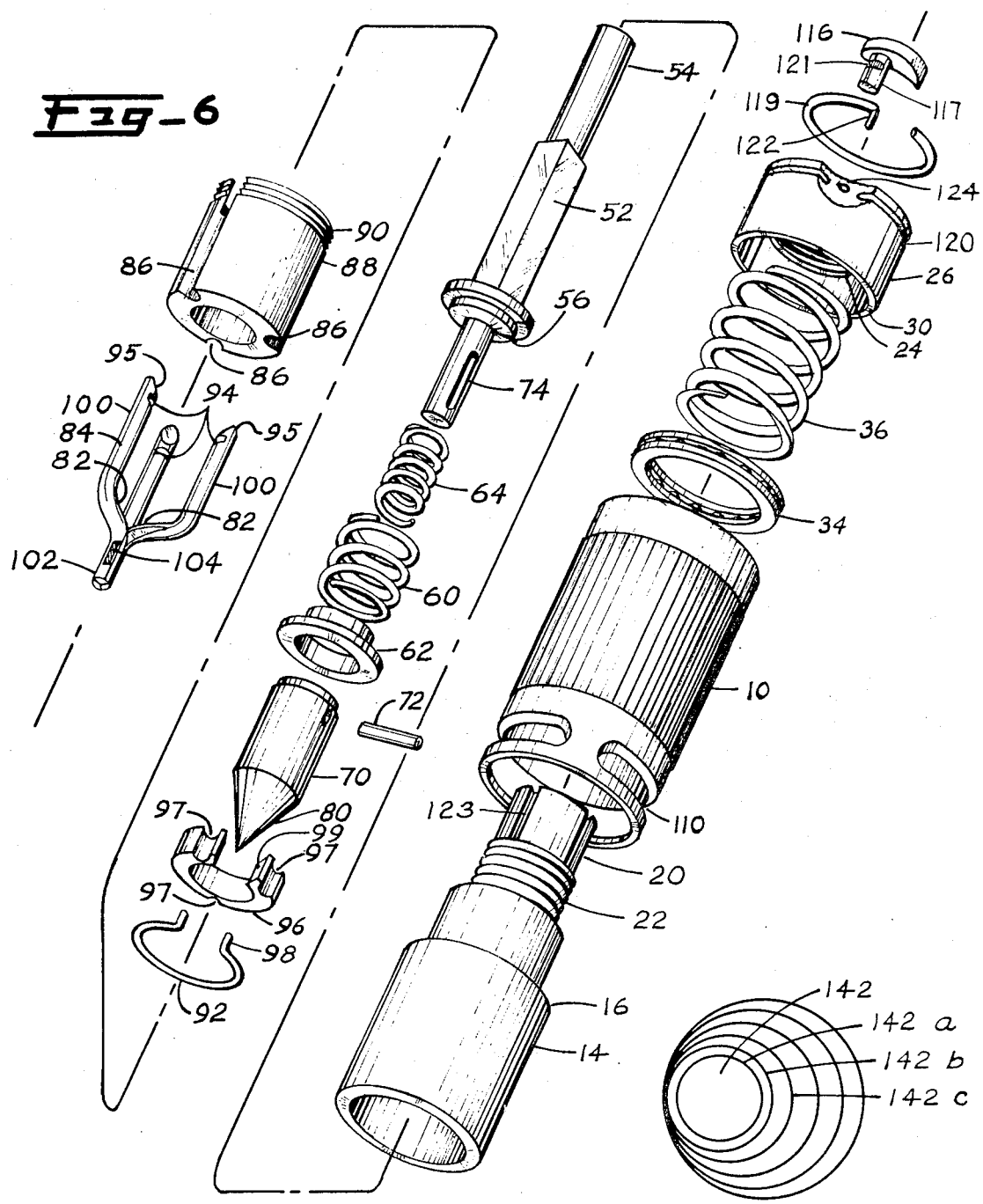

PILOT HOLE ENLARGER

This application is a continuation of copending application Ser. No. 788,276, filed Dec. 31, 1968 and now abandoned.

BACKGROUND OF THE INVENTION

1. Field of Application:

This invention relates to a cutting tool and method, and more particularly, to a tool and method for enlarging an aperture in a first member until the aperture is concentric and of equal diameter to a second member disposed adjacent to said first member.

2. Description of Prior Art

It is quite often necessary to attach two members together through the use of a plurality of bolts, rivets, or the like. If neither member has had formed therein the apertures for the bolts and rivets, then it is a simple matter to drill equally sized and aligned apertures through the adjacent members.

A problem arises when a two membered section is damaged, as often happens with airplane wing tips. The damaged section is removed by drilling out the rivets. This leaves a member with preformed openings. The new member to be attached is formed with undersized or pilot apertures. Once the pilot aperture is placed above and aligned with the preformed aperture, the pilot apertures are drilled or reamed out in an attempt to make them the same as the preformed apertures.

If the apertures are perfectly concentric to begin with and the drilling or reaming operation in accurately performed, then the apertures might be properly formed. But the apertures are almost never perfectly concentric and the operation is undertaken under conditions which make an accurate performance impossible as one can not see the periphery of the preformed aperture.

Existing equipment and techniques often result in diameter enlargement and/or elongation of the preformed aperture, e.g., it becomes oval. As a result, the apertures not only have unaligned peripheries, but also are of different shapes and/or sizes.

In an attempt to avoid elongation, special drill guides have been devised but these guides are expensive to fabricate and cumbersome to use. In addition, when the pilot aperture covers the preformed aperture, the use of drill guides is not always possible or feasible and aperture elongation cannot be avoided.

Elongated apertures and apertures with unaligned peripheries result in attachments with poor shear characteristics. In highly stressed parts this is intolerable, especially when metal thickness or aperture size is critical due to weight or space parameters.

SUMMARY OF INVENTION

This invention involves a cutting tool and method, and especially, a cutting tool and method for enlarging apertures in a first member so that the peripheries thereof are equal in size to and aligned with reference apertures in an adjacent second member. It contemplates the utilization of a plurality of rotatively driven radially movable cutters. Each cutter is formed with an abutment adapted to engage the periphery of the aperture in said second member when wall portions of apertures in the first and second member are aligned. Each of the cutters is further formed with a cutting edge for removing material from the periphery of the aperture in said first member until the abutment so engages the periphery of the aperture in said second member.

It is therefore an object of this invention to provide an improved cutting tool and method.

It is a further object to provide an improved cutting tool and method for enlarging apertures.

A still further object is to provide an improved cutting tool and method for enlarging an aperture in a first member so that said aperture is made concentric and of equal diameter to a reference aperture in a second member disposed adjacent and underlying said first member.

Yet another object is to provide an improved cutting tool and method for enlarging pilot apertures formed in a first member so that said aperture is made concentric and of equal diameter to an aperture preformed in a second member disposed adjacent and underlying said first member; and in such a way that the respective apertures are not elongated and the preformed apertures are not further enlarged.

Other objects, features, and advantages of the invention, in its details of construction and arrangement of parts, will be seen from the above, from the following description of the preferred embodiment when considered in conjunction with the drawings and from the appended claims.

BRIEF DESCRIPTION OF THE DRAWINGS

In the drawings:

FIG. 1 is a perspective view of an aperture enlarging tool, incorporating the invention;

FIG. 2 is an enlarged sectional view of the tool of FIG. 1 with parts cutaway to better show the details thereof;

FIG. 3 is an end view of the tool of FIG. 2;

FIG. 4 is an enlarged sectional view similar to that of FIG. 2 but showing the parts as they would be positioned during a drilling operation;

FIG. 5 is an end view of the tool of FIG. 4;

FIG. 6 is an exploded isometric view of the tool of FIG. 1; and

FIG. 7 is a schematic showing the progression of the tool cutters.

DESCRIPTION OF PREFERRED EMBODIMENT:

For convenience, the invention will be described as applied to a cutting tool adapted to be driven by a portable drill or the like.

The tool includes three cutters, each having an abutment surface aligned with a sharp cutting edge. Each of the cutters further includes a cam surface disposed for coaction with a tapered cone. Longitudinal movement of the tapered cone results in a radial movement of the cutter to bring the sharp cutting edges into engagement with the material to be removed until the abutment surfaces engage a reference surface and terminate the cutting action; it being understood, nevertheless, that the tool can be driven from a self-contained power source, that there may be more or less than three cutters, that the cutters may have an abrasive surface rather than a sharp cutting edge, that the cutting edges and abutment surfaces need not be radially aligned and that the radial movement of the cutters can be accomplished by means other than a longitudinally moving tapered cone coacting with a cam surface on the cutters.

With reference to FIGS. 1 and 2, there is shown generally at 10 a substantially cylindrical housing with a hollow 12 (FIG. 2) therewithin. A cutter barrel 14 (FIG. 2), slidably and rotatably disposed within hollow 12, has formed thereon a shoulder 16 positioned for engagement with a rib 18, extending from housing 10 into hollow 12 to limit movement of cutter barrel 14 in the direction of arrow A (FIG. 2). As hereinafter described, the cutter barrel 14 is adapted to have cutting means secured therein.

Referring to FIGS. 2 and 4, and upper end 20 (FIG. 4) of cutter barrel 14, is externally threaded at 22 for mating engagement with threads 24 formed within an adjustment collar 26. A lower end 30 of adjustment collar 26 is disposed to engage a rotatable thrust bearing 34 (FIG. 4) seated on rib 18 to limit longitudinal movement of cutter barrel 14 in the direction of arrow B (FIG. 2). The extent to which the cutting means, carried by cutter barrel 14, extends from housing 10 can be adjusted by adjusting the threaded connection of collar 26 to barrel 14.

Referring to FIGS. 2 and 4, a spring 36, disposed between thrust bearing 34 and a groove 38 formed within collar 26 normally urges collar 26 in the direction of arrow A (FIG. 2) to space end 30 of collar 26 from thrust bearing 34 and to retract the cutting means carried by cutter barrel 14 to a protected position within the barrel 10. The action of spring 36 is limited by engagement of shoulder 16 of barrel 14 with rib 18.

A longitudinally extending square bore 50 (FIG. 4) is formed in upper end 20 of barrel 14 to receive a square shank 52 formed on a power shaft 54 thereby providing a driving connection between power shaft 54 and cutter barrel 14 so that rotation of the power shaft 54 causes rotation of the cutter barrel 14 and the cutting means carried thereby.

Referring to FIGS. 2 and 4, a limit ring 56 is secured at the lower end of square shank 52 for engagement with a shoulder 58 formed within barrel 14 to limit movement of square shank 52 in the direction of arrow A (FIG. 2). A return spring 60, positioned between limit ring 56 and a spring plate 62, urges shank 52 in the direction of arrow A (FIG. 2). As hereinafter more particularly described, movement of the power shaft 54 in the direction of arrow B (FIG. 2) will compress spring 64 which will in turn force cone 70 to impart resilient radial movement to the cutter means so as to assure continual contact of the cutting means with the aperture as the cutting is taking place.

Referring to FIG. 2, a cone spring 64, concentrically disposed within return spring 60, urges a cutter opening cone 70, in the direction of arrow B (FIG. 2). Shaft 71, which is integrally secured to shank 52 of power shaft 54, is slidably received in a bore 73 in cone 70. A pin 72, carried by cone 70, is slidably disposed in a longitudinally extending slot 74 of shaft 71 to provide a telescoping interconnection between cone 70 and shaft 71.

Referring to FIGS. 2 and 6, a camming surface 80 is formed on cone 70 for coaction with cam surfaces 82 (FIG. 6) formed on cutters 84. Cutters 84 are rockably disposed in grooves 86 (FIG. 6) formed in a cutter holder 88. Cutter holder 88 is threadably secured within cutter barrel 14 as at 90 (FIG. 2).

A spring 92 (FIG. 6), disposed in a hollow 93 (FIG. 2) formed in the upper portion of holder 88, is urged by its own resilience into notches 94 (FIG. 6) formed in the upper ends of cutters 84 to secure cutters 84 within holder 88, and to urge cutters 84 to the closed positions thereof shown in FIG. 2. Cam surfaces 95 (FIG. 6) are formed on the upper ends of cutters 84 to facilitate insertion thereof into groove 86 and to further facilitate snapping notches 94 over spring 92.

In order to remove a cutter 84, the same may be rotated as shown in broken lines in FIG. 3 so as to disengage the notch 94 from the spring 92, and then with the cylindrical portion of cutter 84 bearing against spring 92, the cutter 84 can be passed over spring 92 and removed from holder 88.

A retainer 96 (FIG. 6) is frictionally fixed in place in hollow 93 above spring 92 so as to retain spring 92 in place Notches 97 are formed in retainer 96 to receive the upper ends of cutters 84.

Rotation of the cutter 84 during removal tends to displace spring 92. Free ends 98 of spring 92, disposed between free ends 99 of retainer 19, allows for only limited movement of spring 92 thereby preventing the gap in spring 92 from migrating to a position overlapping groove 86. If the spring 92 could be displaced, the cutters 84 inserted in a groove overlapped by the spring gap would not be locked in place.

Each cutter 84 also has formed thereon a shank portion 100, (FIG. 4 and 6) and an abutment surface 102 and a cutting edge 104. Surface 102 is aligned with cutting edge 104 so that when they engage aligned wall areas, cutting edge 104 is removed from cutting engagement with an adjacent wall area.

Referring to FIG. 2, the lower portion of housing 10 includes suitably formed openings 110 (FIG. 1) to facilitate cooling and chip removal, while an upper edge 112 (FIG. 2) of housing 10 coacts with a set of depth indicia 114 disposed on adjustment collar 26 to provide a visual indication of the extent to which the cutting means will be extended.

Referring to FIG. 4 and 6, a thumb lock 116 is provided so as to lock collar 26 and cutter barrel 14 together between adjustments. Thumb lock 116 is mounted on collar 26 by a notched pin 117 which extends into a bore 118. A locking spring 119 is provided and received in a peripheral groove 120 extending about collar 26 and into bore 118. The spring 119 is adapted to be biased into the notch 121 on pin 117 so as to releasably lock the pin 117 and in turn, the thumb lock 116 in place.

Spring 119 includes a radially inwardly extending end portion 122. When spring 119 rests in notch 121. End portion 122 extends through a radially extending bore 124 (FIG. 6) in collar 26 into a selected groove 123 (FIG. 4) formed on cutter barrel 14. By rotating thumb lock 116, spring 119 is biased outwardly as it moves out of notch 121 thereby withdrawing end portion 122 from groove 123. When end portion 122 is withdrawn, cutter barrel 14 may be readily adjusted with respect to collar 26. The four grooves 123 permit quarter turn adjustments of collar 26 to cutter barrel 14. It is to be understood that any number of grooves 123 could be formed so as to provide adjustment to any desired degree.

OPERATION

In use, a bit end 120 (FIG. 2) of tool 10 is disposed in the chuck of power drill 130 (FIG. 1). Adjustment collar 26 is set to a dimension corresponding to the thickness of material 140 (FIG. 2) having formed therein a pilot hole or aperture 142 which is to be enlarged so that the periphery thereof is the same size as, and is aligned with, the periphery of a hole or aperture 144 performed in a material 146. The lower end of housing 10 is positioned on the upper surface of material 140 and pressure is applied to power shaft 52 to move same in the direction of arrow B (FIG. 2).

Movement of power shaft 52, in the direction of arrow B, initially moves cutter barrel 14 and collar 26 until lower end 30 of collar 26 engages thrust bearing 34; continued movement of power shaft 52 compresses spring 60 and spring 64, and spring 64 urges cone 70 downward, rotating cam surfaces 82 on cutters 84 outward, to dispose cutting edges 104 of cutters 84 adjacent to the walls of aperture 142.

When drill 130 is energized the rotative drive power thereof will be imparted to power shaft 52, cutter barrel 14, cutter holder 88 and cutters 84, and as cutters 84 are so rotated cutting edges 104 thereof will cut away the material from the wall of aperture 142. During the cutting operation, spring 64 urges cone 70 in the direction of arrow B (FIG. 2) to keep camming surface 80 thereof in forcefull engagement with cam surfaces 82 of cutters 84. The coaction of camming surface 80 with cam surfaces 82 urges cutters 84 radially out to maintain cutting edges 104 thereof in position to cut material from aperture 142. The cutting coaction continues with aperture 142 increasing in size as shown at 142a, 142b, etc. (FIG. 7) until abutment surfaces 102 of cutters 84 engage the wall of aperture 144 throughout their entire rotation.

In this manner, as a portion of the wall of aperture 142 becomes aligned with a portion of the wall of aperture 144, no more material will be removed therefrom, but where the walls are not so aligned cutting will continue.

When the apertures are identical, the power can be turned off and pressure removed from power shaft 52. Spring 60 returns ring 56 of the power shaft 54 into engagement with shoulder 58 of cutter barrel 14. Shaft 71 secured to ring 56 also returns and during this return, pin 72 of cone 70 is engaged, thereby withdrawing the cone from cam surfaces 82 of cutters 84. Spring 92 then pushes out on the upper ends of cutters 84 so as to rock the cutters to their closed positions FIG. 2. Spring 36 returns collar 26 and cutter barrel 14 to their FIG. 2 positions.

It should be obvious from the above description that where the use requires, the power drive may be integrally connected to power shaft 54 so that the tool and its drive are all one unit. In addition, if it is desired to remove the wall material by abrading rather than cutting, it should be obvious that cutters 84 may incorporate abrasive surfaces instead of cutting edges.

From the above description it will thus be seen that a novel and improved aperture enlarging tool and technique have been provided; which tool and technique by utilizing radially moving cutters having aligned cutting and guide surfaces, insures that the periphery of a first aperture can be enlarged to the same size as, and into exact alignment with, the periphery of a second aperture without elongating the aperture.

It should be understood that the various modifications may be made in the details thereof without departing from the spirit as comprehended by the following claims.

I claim:

1. The combination comprising a plurality of cutter means, means for rotating said plurality of cutter means, mounting means for each of said cutter means defining a mounting axis, actuating means for moving said cutter means radially while rotating the cutter means about their individual mounting axis, said mounting axis being parallel to the axis of the rotating cutter means to assure perpendicularity of the sides of a hole being cut, a housing, said actuating means being responsive to longitudinal manual pressure and independent of cutter speed for moving said cutter means radially.

2. The combination as defined by claim 1, said cutter means including cutter blades having complementary nestable faces, said cutter blades being nested before actuation to minimize their diameter and allow application to small apertures.

3. The combination as defined by claim 1, said cutter means being rotatable through an angle so as to increase the size of an opening by over 100 percent.

4. The combination as defined by claim 1, a housing, means for moving said cutter means longitudinally along the axis of said housing, means normally biasing said cutter means within said housing, said actuating means including means for moving said cutter means along the axis of said housing to an operative position external of said housing, said actuating means including means for adjusting the extent said cutter means extend from said housing so as to adjust the depth of cutting.

5. The combination as defined by claim 4, said actuating means including a single drive shaft which in response to longitudinal movement and rotation moves said cutter means longitudinally, rotates said cutter means and urges said cutter means outwardly.

* * * * *